United States Patent [19]

Ball et al.

[11] Patent Number: 4,486,620

[45] Date of Patent: Dec. 4, 1984

[54] AERIAL COMMUNICATIONS CABLE SPLICE CLOSURE AND END CAP USEFUL THEREWITH

[75] Inventors: James H. Ball, St. Paul; Ronald C. Houts, Vadnais Heights; Phillip R. Schaetzel, St. Paul, all of Minn.

[73] Assignee: Minnesota Mining and Manufacturing Company, St. Paul, Minn.

[21] Appl. No.: 481,155

[22] Filed: Apr. 1, 1983

[51] Int. Cl.$^3$ .......................................... H02G 15/113
[52] U.S. Cl. ...................................... 174/41; 174/92; 174/93
[58] Field of Search ...................... 174/41, 44, 91, 92, 174/93

[56] References Cited

U.S. PATENT DOCUMENTS

| | | | |
|---|---|---|---|
| 3,040,121 | 6/1962 | Gillemot | 174/93 |
| 3,153,693 | 10/1964 | Baxter et al. | 174/41 X |
| 4,015,072 | 3/1977 | Gillemot | 174/93 X |
| 4,084,066 | 4/1978 | Gillemot | 174/92 |

Primary Examiner—Laramie E. Askin
Attorney, Agent, or Firm—Donald M. Sell; James A. Smith; James V. Lilly

[57] ABSTRACT

An aerial communications cable splice closure comprising a hollow body, electrically conductive hanger brackets and end caps which are each adapted to receive at least one cable end. The body comprises separate longitudinal top and bottom sections which are adapted to mate with one another, the top section having the electrically conductive hanger means therein and the bottom section having vent means therein. The hanger means is adjustable to accept a variety of messenger wires. The end caps each have a pair of external, parallel, longitudinal walls which define a narrow channel therebetween, a cable receiving portion containing at least one conical cable-receiving port and a base portion having a plurality of deformable external, longitudinal ribs disposed therearound, a first end adapted to fit over the end of said body, and a second end attached to said cable-receiving portion.

14 Claims, 12 Drawing Figures

AERIAL COMMUNICATIONS CABLE SPLICE CLOSURE AND END CAP USEFUL THEREWITH

This invention relates to aerial closures for communications cable splices and to end caps useful therewith. More particularly it relates to free-breathing, normally closed, field splittable aerial closures.

Telephone cables may carry hundreds or thousands of pairs of insulated copper wires enclosed in a flexible metal shield and one or more plastic tubular sheaths. Where two or more cable ends are joined together, as in extending a cable or in tapping into an extended cable, the splice area must necessarily be enclosed so as to protect it from moisture, animals, birds, insects, bees and so forth. The term "cable end" as used here means an area of exposure of the insulated conductors by removal of the outer sheath or sheaths, shield, and any additional wrappings or coverings, whether or not the conductors themselves are terminated.

One previously used closure technique has employed dry air or nitrogen under pressure to prevent ingress of moisture. However, it is very difficult to maintain the pressure of the air or nitrogen in the closure. Other closure techniques have employed encapulants or potting compounds. However, the encapsulants or potting compounds make reentry into these closures extremely messy. Moreover, these closures are not well suited for use as aerial closures.

Still other forms of splice closures are known. For example, U.S. Pat. Nos. 3,040,121 and 4,084,066 disclose a pair of cylindrical longitudinally slit end members, a longitudinally slit coupling sleeve adapted to receive the end members, and a slotted locking strip adapted to hold opposed ends of the end members and the coupling sleeve in position. The end members are telescopically moveable within the coupling sleeve.

U.S. Pat. No. 3,153,693 describes a splice closure which employs splittable nozzles as end members which are held together by a slotted locking member.

Each of the closures disclosed in these patents is adapted to receive only two cable ends. Consequently, they are not suitable for accepting more than one cable in each end cap in a normally closed, field splittable closure.

The present invention provides a novel free-breathing closure for a communications cable splice. The closure end caps are normally closed yet field-splittable. The closure utilizes electrically conductive hanger means which are adapted to maintain the closure on a messenger wire without the need for tightening the hanger means about the messenger. The closure also utilizes end caps which are adapted to receive at least one cable end per cap and which are novel in themselves. Both rigid bond and floating bond closures are provided. The present invention also provides a closure which may be extended by "bricking" its body portions.

These and other features of the present invention will now be described in more detail in connection with the attached drawings, in which.

Figure 1:
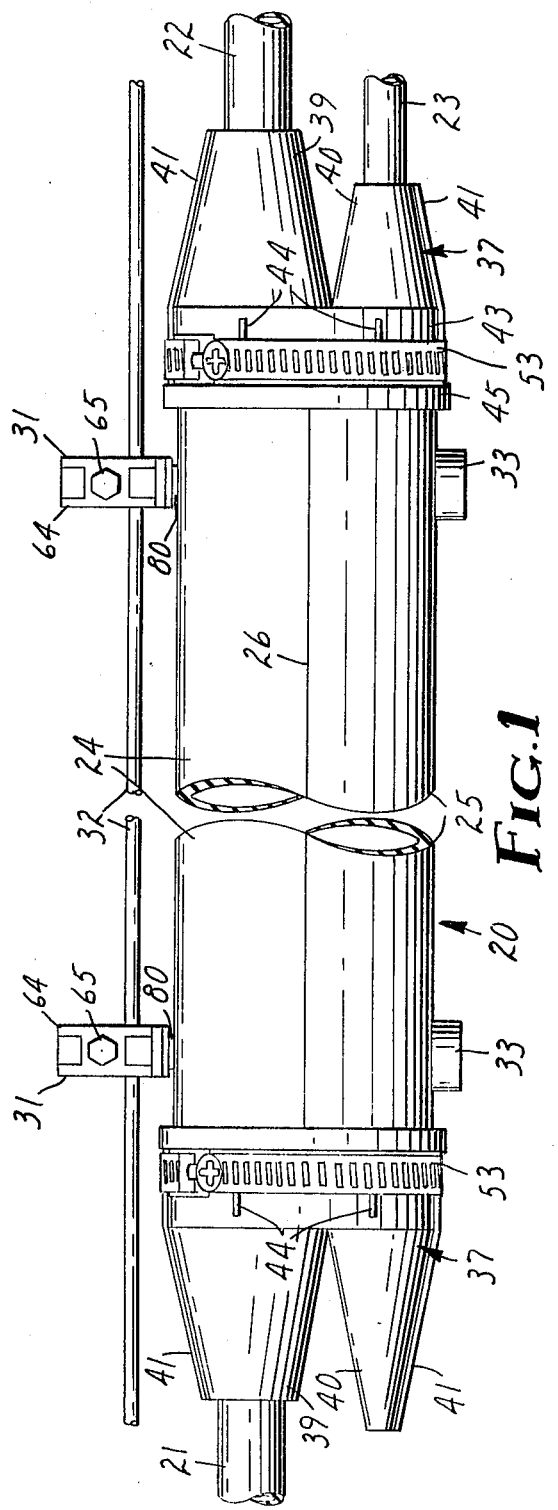
FIG. 1 is a view in elevation of the closure as applied to a cable splice.

FIG. 1 illustrates a cable splice closure 20 surrounding three cable ends 21, 22, and 23. The closure comprises a longitudinal top section 24, longitudinal bottom section 25, and end caps 37. In the embodiment shown body sections 24 and 25 are generally semicircular and are joined together along line 26.

Figure 11:
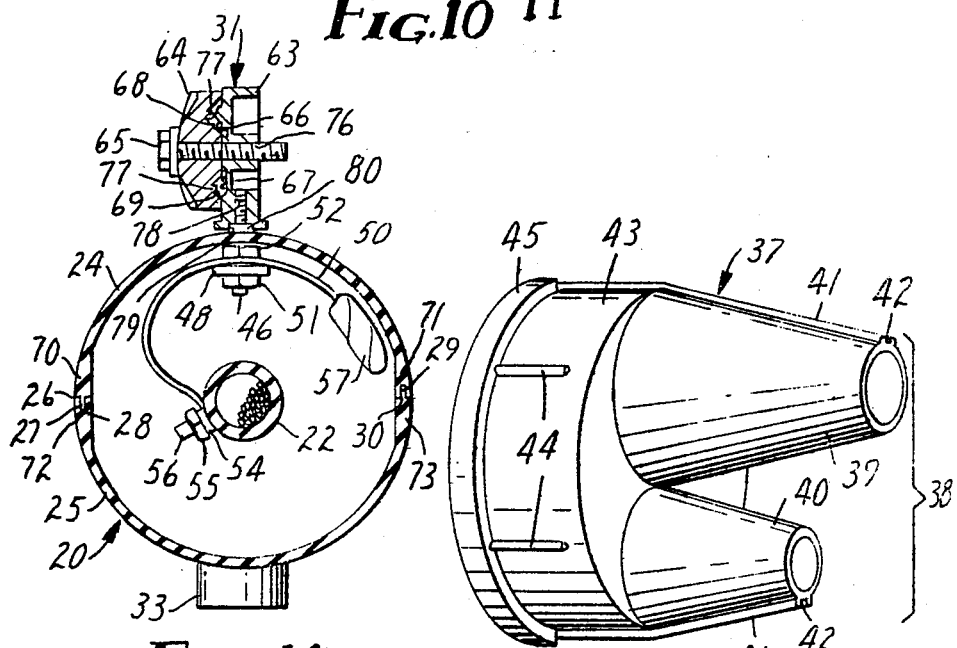
FIG. 11 is a view taken along line 11—11 of FIG. 10 having the hanger means further shown in section.
Figure 9:
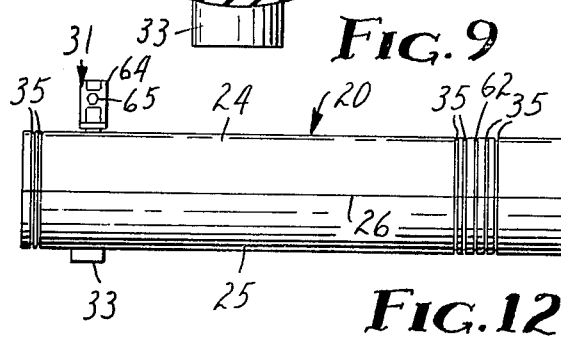
FIG. 9 is a partially exploded view taken along line 9—9 of FIG. 8.

FIGS. 9 and 11 illustrate a preferred technique for joining section 24 to section 25. Each of sections 24 and 25 has longitudinal walls 70, 71, 72 and 73. Walls 70 and 73 respectively terminate in tongues 27 and 29 while walls 71 and 72 terminate in grooves 28 and 30. When the body section is assembled, tongue 27 of section 24 engages groove 28 of section 25 while tongue 29 of section 25 engages groove 30 of section 24.

Body section 24 further comprises hanger means 31 to permit attachment of the closure 20 to a messenger wire 32 while body section 25 preferably further comprises vent means 33. Hanger means 31 are attached to closure 20 through top section 24 by means of bolts 46. See FIGS. 8-11. The vent means, which permit closure 20 to be free-breathing, are preferably located in the lower portions of bottom section 25 so as to also act as drains for any moisture which may collect therein. A screen 34 is preferably provided so as to minimize the ingress of birds, insects, bees, etc.

Figure 4:
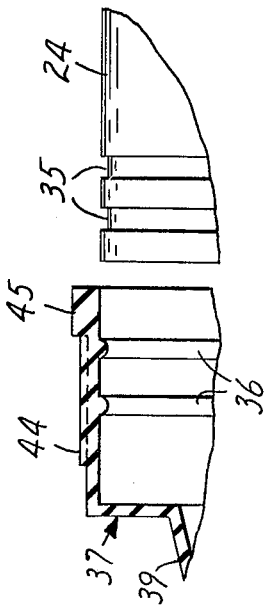
FIG. 4 is a detail view, partially in section, showing a portion of the end cap and a portion of the body of the closure.

The top and bottom sections 24 and 25 are preferably externally annularly grooved at 35 (see FIG. 4). Grooves 35 cooperate with ridges 36 of end caps 37, as will be discussed more fully hereinafter.

Closure 20 utilizes hanger means 31. A preferred bracket is illustrated in more detail in FIG. 11. It comprises body 63 and cap 64 joined together centrally by an adjustable tightening means, here illustrated as threaded bolt 65. Body 63 and cap 64 each have a central opening 76, here a threaded opening, for receiving bolt 65.

Body 63 further has a transverse raised projection 66 (shown here as a semicircular ridge) and a transverse wire-receiving channel 67. The wire-receiving channel as shown has a semicircular cross-section. Projection 66 and wire-receiving channel 67 are equidistantly located, respectively, above and below opening 76. Body 63 further has bolt-receiving port 78 for receiving bolt 46 and optionally recess 79 for receiving grommet 80.

Cap 64 further has a pair of parallel, transverse wire-receiving grooves 68 and 69 of differing size which are equidistantly located above and below opening 76 so as to be opposed to projection 66 and wire-receiving channel 67. Grooves 68 and 69 are of different size so as to enable the hanger means 31 to accommodate a variety of diameters of messenger wires.

Locating grooves 68 and 69, channel 67, and projection 66 equidistantly above and below central opening 76 so that grooves 68 and 69 are in opposition to channel 67 and projection 66 has a particular advantage. This places the messenger at essentially the same distance from the bolt as is the fulcrum created on the other side of the bolt. Accordingly, the bolt is not bent when the hanger means is tightened about the messenger wire. Preferably wire-receiving grooves 68 and 69 have a V cross-section. Additionally, it is preferred that pointed teeth 77 be provided in the base of grooves 68 and 69. Teeth 77 grip the messenger 32 when bolt 65 is tightened so as to prevent closure 20 from twisting about the messenger.

When a closure 20 is to be installed, the appropriate groove 68 or 69 is selected for use based upon the diameter of the messenger wire. This groove is then situated so as to be in opposition to channel 67. The hanger is then placed over the messenger wire. Bolt 65 need not be tightened at this time as it is above the messenger and will prevent the closure from falling off. Raised projection 66 is employed above the bolt so as to discourage an installer from placing the messenger above the bolt.

Figure 2:
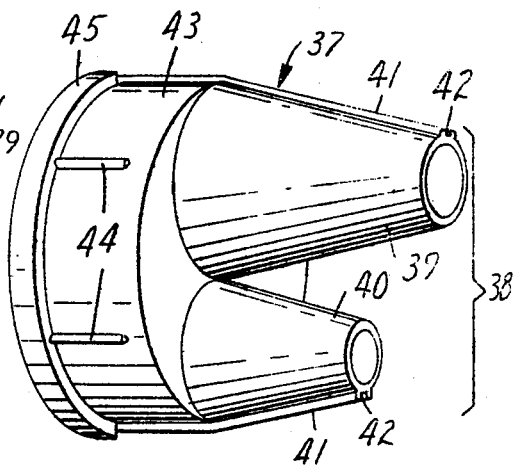
FIG. 2 is a view in perspective of a preferred embodiment of the end cap of the invention.
Figure 3:
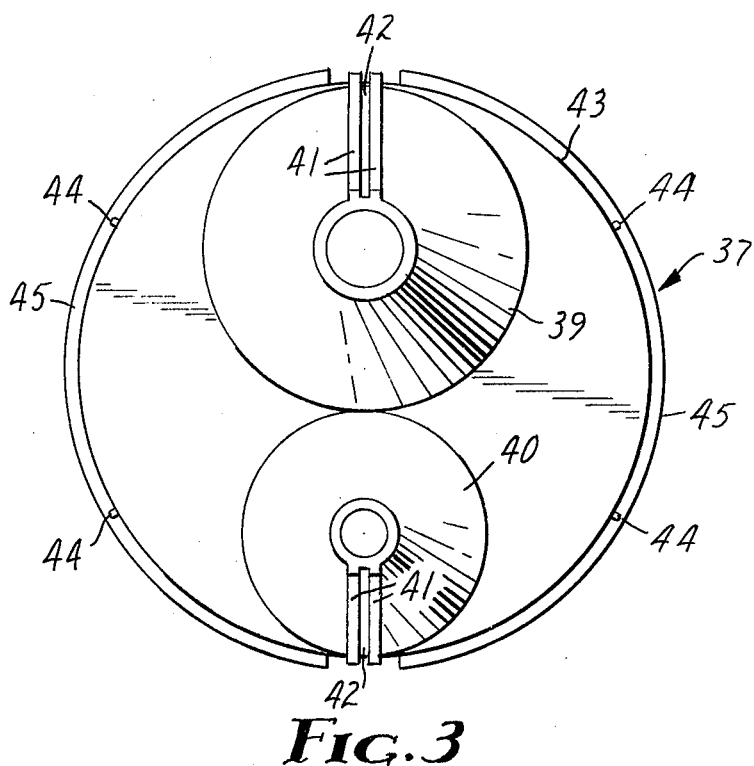
FIG. 3 is a front elevation of the end cap of FIG. 2.
Figure 5:
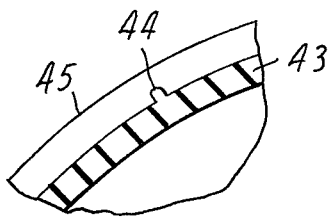
FIG. 5 is a detail view showing an end cap and one of its deformable, external, longitudinal ribs before being deformed.
Figure 6:
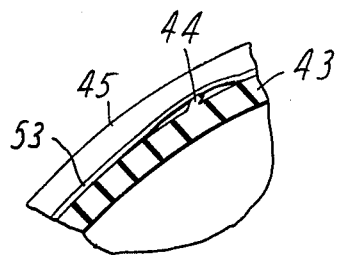
FIG. 6 is a detail view showing a clamping means applied to the end cap and deforming one of the external, longitudinal ribs.

Closure 20 further comprises end caps 37. Referring specifically to FIG. 2, end caps 37 comprise a pair of external, parallel, longitudinal walls 41 which define a narrow channel 42 between them. Walls 41 and channel 42 are shown in more detail in FIG. 3.

End caps 37 further comprise cable-receiving portion 38 and joined to base portion 43. Cable-receiving portion 37 comprises at least one conical cable-receiving port. The preferred embodiment shown in the figures employs two cable-receiving ports 39 and 40.

Base portion 43 is attached to cable-receiving portion 38 and is adapted to matingly fit over the end of top and bottom sections 24 and 25 of closure 20. A plurality of deformable external longitudinal ridges 44 are provided about the outer circumference of base portion 43. Preferably base portion 43 has an external, annular ridge 45 which, most preferably, is taller than ridges 44.

The interior of base portion 43 preferably has annular ridges (see FIG. 4) which are located such that they will fit in locking engagement with the external annular grooves 35 of top and bottom sections 24 and 25 when the end cap 37 is placed over the end of these sections.

Figure 10:
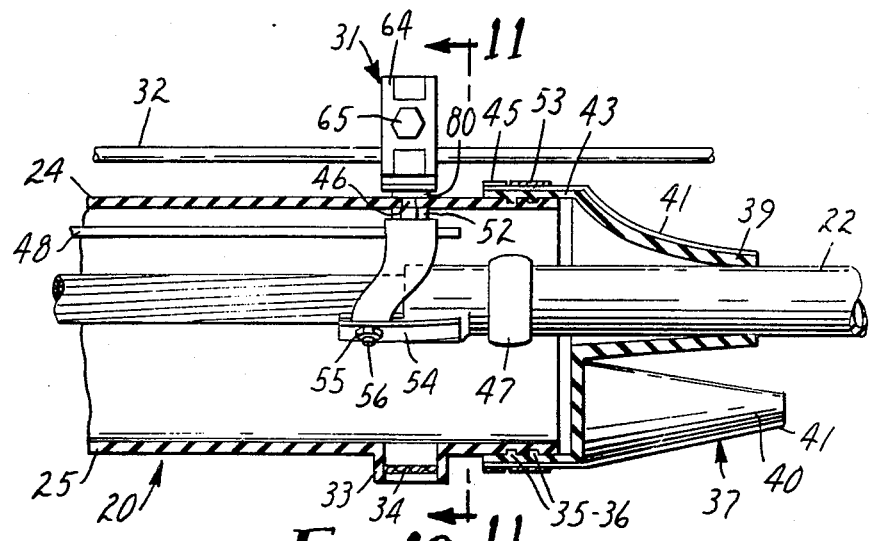
FIG. 10 is a view in longitudinal cross-section showing a floating bond splice assembly in the closure of FIG. 1.
Figure 8:
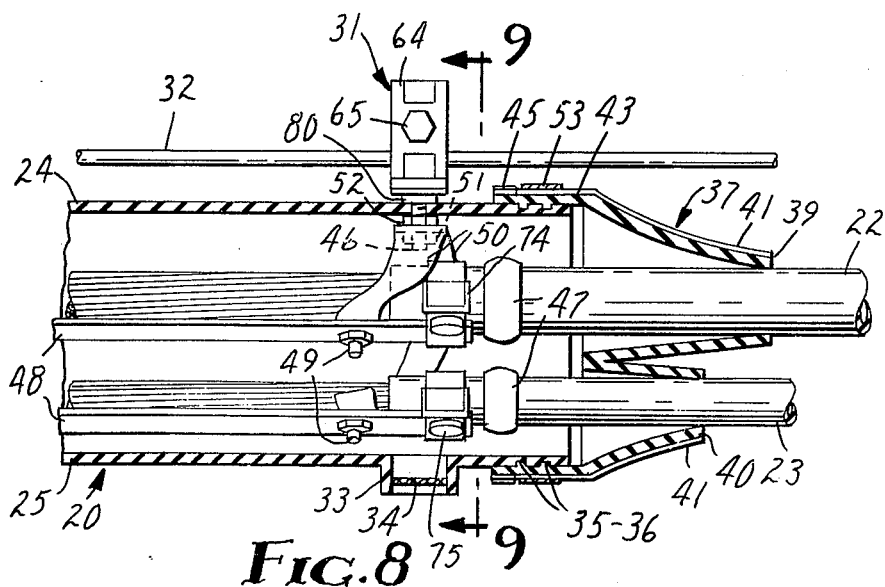
FIG. 8 is a view in longitudinal cross-section showing a rigid bond splice assembly in the closure of FIG. 1.

FIGS. 8 and 9 illustrate a completed rigid bond closure while FIGS. 10 and 11 illustrate a completed floating bond closure. Referring specifically to FIGS. 8 and 9, the ends of cable-receiving ports 39 and 40 are cut off as close as possible to the diameter of cable ends 22 and 23 and the cable ends are inserted into the resultant openings. The end caps need not be slit along groove 42 for original splicing. Drip collars 47 of a suitable mastic tape overwrapped with rubber or vinyl tape are wound around cable ends 22 and 23 to prevent water from flowing down the cable and affecting the performance of the splice (not shown). Bond bars 48 are secured between the cable ends through connector studs 49 to the metal sheath of the cable ends. Hose clamps 74 and 75 are placed over the ends of the bond bars and cable ends 22 and 23. Braided grounding straps 50 are connected to bond bars 48 by studs 49 and to the hanger bracket 31 between nuts 51 and nuts 52. Once assembled, the bond bars 48 and the grounding straps 50 provide a continuous electrical ground path from each cable end through the hanger bracket to the messenger. This protects the splice from sudden power surges due, for example, to lightning strikes.

Each end cap 37 is secured to mated upper and lower body sections 24 and 25 by means of a clamping means 53, here a hose clamp. The clamping means 53 deforms the external, longitudinal ridges 44 of the end caps 37 and forms an indentation in each of the ridges 44 into which it fits. These indentations serve as a positive lock on the clamping means and prevent it from sliding off of the end cap. The clamping means may be provided with a quick disconnect element (not shown), or alternatively, it may be provided with torque or break-off screws.

The floating bond closure illustrated in FIGS. 10 and 11 is similar to the rigid bond closure illustrated in FIGS. 8 and 9 with one major exception. In the floating bond closure only a single bond bar 48 is utilized which is secured directly to the hanger brackets 31 by means of nuts 51 and 52 and bolts 46. Braided grounding strap 50 on each end of the closure is connected on one end to hanger bracket 31 by means of bolt 46 and on the other end to shield connector 54 by means of nut 55 and bolt 56. Shield connector 54 is in turn connected to the metal sheath of cable end 22.

Once assembled, the bond bar 48 and the grounding strap provide a continuous electrical ground path from each cable end through the hanger bracket to the messenger to protect the splice from sudden power surges. The closure demonstrated in FIGS. 10 and 11 is shown in connection with a single cable end 22 joined to another single cable end. Consequently, one end of braided grounding strap 50 has been covered with an electrically insulating material 57 such as electrical tape. In the event that a second cable were provided through the end cap 37, the end of the grounding strap 50 would be joined to the cable end rather than being covered with an electrically insulating material.

If desired, the splice bundle may be tied to the bond bar 48 in the floating bond closure by means of some suitable device, e.g. a cable tie, so as to raise the splice bundle from the floor of the closure and protect it from exposure to moisture, which might collect in the bottom of the closure.

Figure 7:
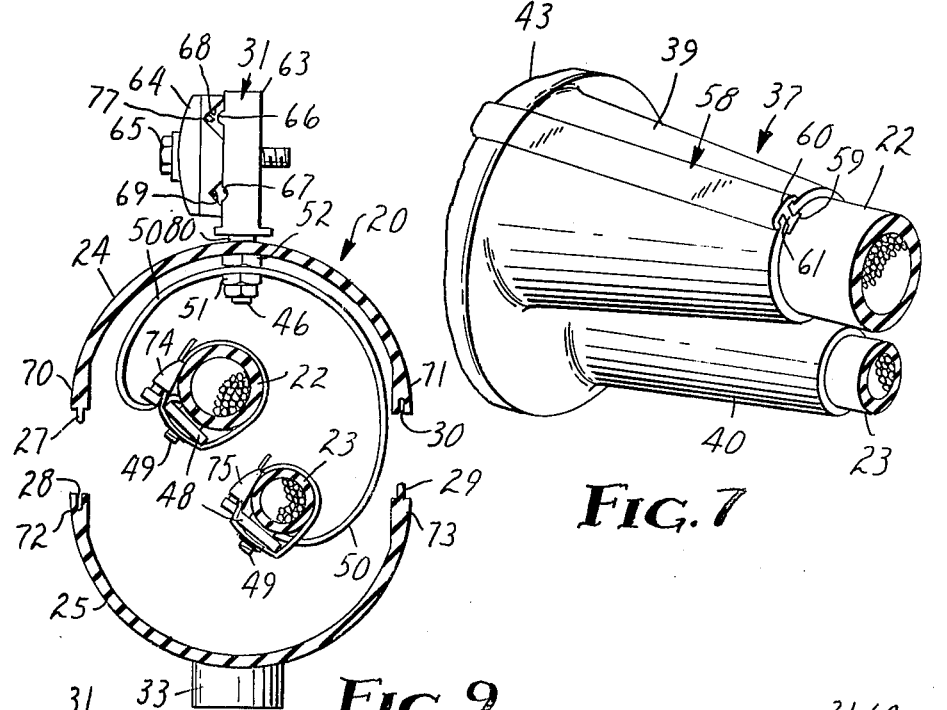
FIG. 7 is a perspective view of the end cap of FIG. 2 after being split and employing a locking strip.

FIG. 7 illustrates the reenterability of the closure of the invention. When reentry into a completed closure is desired, the clamping means 53 and end cap 37 are removed from closure 20. The end cap 37 may then be longitudinally cut through along one of the grooves 42 and a cable end slipped into the end cap 37 through the slit. Once the splice has been made in the closure 20, and the top and bottom body sections 24 and 25 reassembled, the end cap 37 is placed over the end of said body sections. A locking strip 58 is then placed over the opposed ends of the slit end cap so as to hold them in position. Clamping means 53 is then replaced around the base portion 43 of end cap 37 and locked in place.

The locking strip utilized in the invention is flexible and is generally T-shaped. It comprises a lower base 59 and a top 60 having an inverted U-shape. Base 59 and top 60 are joined by wall 61 which is generally perpendicular to base 59 and which connects the midpoint of the base 59 to the midpoint of top 60.

Once the locking strip is applied, one of vertical walls 41 fits into the passageway defined by the base 59, the top 60 and one side of wall 61 while the other vertical wall 41 fits into the passageway defined by the base 59, the top 60 and the other side of wall 61.

Figure 12:
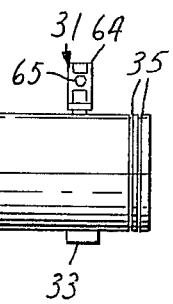
FIG. 12 is a view in elevation of the body portion of the closure of FIG. 1.

FIG. 12 illustrates the complete top and bottom sections 24 and 25. Both sections 24 and 25 are adapted to be cut at slot 62 so as to provide a half-section. Half-sections are particularly useful when it is desired to provide an elongated body. This may be done by "bricking" the top and bottom sections. Thus a full bottom section and a bottom half-section may be placed end-to-end and mated with a top half-section (placed over the end of the full bottom section) and a full top section placed end-to-end. The joints at which the full and half sections meet in end-to-end fashion may then be wrapped or clamped with a suitable means to prevent them from spreading apart.

What is claimed is as follows:

1. An aerial closure for a communications cable splice comprising a hollow body, electrically conductive hanger means on said body, and end caps for said body; wherein said body comprises separate longitudinal top and bottom sections adapted to mate with one another, said top section having said hanger means therethrough;

said hanger means comprises separate body and cap sections joined together centrally by an adjustable tightening means; wherein said body section has a first central opening for receiving said tightening means, and a transverse raised projection and a transverse wire-receiving channel equidistantly located above and below said first opening; and wherein said cap section has a second central opening for receiving said tightening means, and a pair of parallel, transverse wire-receiving grooves equidistantly located above and below said second opening so as to be opposed to said raised projection and said wire-receiving channel, and wherein one of said wire-receiving grooves is of different size than the other;

said end caps each comprise (i) a pair of external, parallel, longitudinal walls which define a narrow channel therebetween, (ii) a cable-receiving portion containing at least one conical cable-receiving port and (iii) a base portion having a plurality of deformable external, longitudinal ribs disposed therearound, a first end adapted to fit over the end of said body, and a second end attached to said cable-receiving portion.

2. An aerial closure according to claim 1 wherein said top and bottom body sections are generally semicylindrical and each have longitudinal walls for engagement with corresponding longitudinal walls of the other section, one said walls of said top section having a longitudinal tongue for engagement with a longitudinal groove of one of said walls of said bottom section and the other of said walls of said top section having a longitudinal groove for engagement with a longitudinal tongue of the other of said walls of said bottom section.

3. An aerial closure according to claim 2 wherein said top and bottom sections each have at least one external annular groove adjacent the ends thereof, and wherein said end caps each have at least one internal annular ridge proximate said first end adapted to be received in said external annular groove.

4. An aerial closure according to claim 3 wherein said end caps each have an external annular ridge proximate said first end thereof.

5. An aerial closure according to claim 1 further comprising electrical grounding means connected to said hanger means through said top section of said body.

6. An aerial closure according to claim 1 wherein the cable-receiving portion of at least one of said end caps contains at least two of said cable-receiving ports.

7. An aerial cable splice assembly comprising
(a) at least two cable ends having electrical continuity therebetween;
(b) a splice closure assembly around said cable ends comprising a hollow body, electrically conductive hanger means on said body, and end caps for said body, wherein
  (i) said body has top and bottom sections joined together; and wherein said top section has said electrically conductive hanger means therethrough which comprise separate body and cap sections joined together centrally by an adjustable tightening means; wherein said body section has a first central opening for receiving said tightening means, and a transverse raised projection and a transverse wire-receiving channel equidistantly located above and below said first opening; and wherein said cap section has a second central opening for receiving said tightening means, and a pair of parallel, transverse wire-receiving grooves equidistantly located above and below said second opening so as to be opposed to said raised projection and said wire-receiving channel, and wherein one of said wire-receiving grooves is of different size than the other; and wherein said bottom section has vent means therein;
  (ii) end caps over each end of said hollow body wherein said end caps have a pair of external longitudinal walls defining a narrow channel therebetween, a cable-receiving portion containing at least one conical cable-receiving port, and a base portion having a plurality of deformable, external longitudinal ribs disposed therearound, a first end adapted to fit over the end of said hollow body, and a second end attached to said cable-receiving portion;
  (iii) a clamping means disposed about each said base portion of each of said end caps and forming indentations in said external longitudinal ribs which receive said clamping means;
  (iv) a bonding bar between said hanger means and said cable ends; and
  (v) a grounding strap joined to said hanger brackets, said bonding bar and said cable end for providing a continuous grounding path therebetween.

8. An aerial communications cable splice assembly according to claim 7 wherein at least one of said cable-receiving ports of one of said end caps is slit longitudinally along said narrow channel and wherein said end cap is held together by a locking strip comprising a lower base, an inverted U-shaped top and a wall generally perpendicular to said lower base joining said lower base to said top.

9. An aerial communications cable splice assembly according to claim 8 wherein the cable-receiving portion of at least one of said end caps contains at least two of said cable-receiving ports.

10. An end cap adapted for use with a communications cable splice assembly comprising a pair of external, parallel, longitudinal walls which define a narrow channel therebetween, a base portion having a plurality of deformable external longitudinal ribs therearound, said base portion being joined to a cable-receiving portion having at least one conical cable-receiving port.

11. An end cap according to claim 10 wherein said cable-receiving portion has at least two of said cable-receiving ports.

12. An aerial closure for a communications cable splice comprising:
a hollow body having separate longitudinal top and bottom sections adapted to mate with one another;
electrically conductive hanger means connected to said top body section and projecting externally therefrom; and
end caps adapted to be received by the ends of said body, said end caps each comprising (i) a pair of external, parallel, longitudinal walls which define a narrow channel therebetween, (ii) a cable-receiving portion containing at least one conical cable-receiving port and (iii) a base portion having a plurality of deformable external, longitudinal ribs disposed therearound, a first end adapted to fit over the end of said body, and a second end attached to said cable-receiving portion.

13. An aerial closure according to claim 12 wherein said hanger means is adjustable to receive a variety of messenger wires.

14. An aerial closure according to claim 13 wherein said bottom section has vent means therein.

* * * * *